(12) United States Patent
Takahashi et al.

(10) Patent No.: US 10,159,094 B2
(45) Date of Patent: Dec. 18, 2018

(54) COMMUNICATION DEVICE, COMMUNICATION SYSTEM, COMMUNICATION METHOD AND RECORDING MEDIUM

(71) Applicant: CASIO COMPUTER CO., LTD., Shibuya-ku, Tokyo (JP)

(72) Inventors: Toshihiro Takahashi, Hamura (JP); Takahiro Tomida, Hamura (JP); Tsutomu Terazaki, Hamura (JP); Ryo Okumura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 149 days.

(21) Appl. No.: 15/263,514

(22) Filed: Sep. 13, 2016

(65) Prior Publication Data

US 2017/0188389 A1 Jun. 29, 2017

(30) Foreign Application Priority Data

Dec. 24, 2015 (JP) ................................. 2015-250834

(51) Int. Cl.
*H04W 74/08* (2009.01)
*H04W 48/12* (2009.01)
(Continued)

(52) U.S. Cl.
CPC ....... *H04W 74/0816* (2013.01); *H04W 48/12* (2013.01); *H04L 69/22* (2013.01);
(Continued)

(58) Field of Classification Search
CPC .......................... H04W 74/0816; H04W 48/12
See application file for complete search history.

(56) References Cited

U.S. PATENT DOCUMENTS 9,374,444 B2 * 6/2016 Ho ......................... G06Q 10/06
2013/0178150 A1 * 7/2013 Park ....................... H04W 84/12
455/11.1

(Continued)

FOREIGN PATENT DOCUMENTS

JP 2012-519439 8/2012

OTHER PUBLICATIONS

IEEE Standard for Local and metropolitan area networks—Part 15.6: Wireless Body Area Networks, IEEE Std 802.15.6-2012, 1-271 pages, Feb. 29, 2012 (May be retrieved from <URL:standards.ieee.org/findstds/standard/802.15.6-2012.html>).*

*Primary Examiner* — Albert T Chou
(74) *Attorney, Agent, or Firm* — Amin, Turocy & Watson LLP

(57) ABSTRACT

According to an aspect of the present invention, a device for communication according to a specific communication protocol is provided. The communication device includes a processor for generating and processing frames based on frame formats defined by the communication protocol. The processor generates a beacon frame so that information on a collision avoidance scheme supported by the device of a plurality kinds of information specified based on the communication protocol is omitted. Further, the processor processes a connection request frame transmitted from other device to extract information on a collision avoidance scheme supported by the other device, and controls communication with the other device based on comparison of the extracted information on the collision avoidance scheme with the information on the collision avoidance scheme supported by the device.

15 Claims, 18 Drawing Sheets

(51) Int. Cl.
*H04L 29/06* (2006.01)
*H04W 74/00* (2009.01)

(52) U.S. Cl.
CPC .......... *H04W 74/008* (2013.01); *Y02D 70/00* (2018.01); *Y02D 70/142* (2018.01); *Y02D 70/144* (2018.01); *Y02D 70/20* (2018.01)

(56) References Cited

U.S. PATENT DOCUMENTS

| | | | |
|---|---|---|---|
| 2014/0029594 A1* | 1/2014 | Lee | H04W 72/0446 370/336 |
| 2016/0057779 A1* | 2/2016 | Kim | H04W 74/006 370/338 |
| 2016/0183258 A1* | 6/2016 | Matsuo | H04W 74/006 370/348 |
| 2017/0289320 A1* | 10/2017 | Norair | H04L 1/0061 |
| 2017/0289941 A1* | 10/2017 | Ameixiera | H04W 56/0025 |

* cited by examiner

COMMUNICATION DEVICE, COMMUNICATION SYSTEM, COMMUNICATION METHOD AND RECORDING MEDIUM

CROSS-REFERENCE TO RELATED APPLICATIONS

This application is based upon and claims the benefit of priority under 35 USC 119 of Japanese Patent Application No. 2015-250834 filed on Dec. 24, 2015, the entire disclosure of which is incorporated herein by reference in its entirety for all purposes.

BACKGROUND OF THE INVENTION

1. Field of the Invention

The present invention relates to a communication device, a communication system, a communication method, and a computer readable recording medium for recording a program for executing the communication method.

2. Description of the Related Art

Conventionally, many research studies have been done on application of the information communication technology to fields where devices disposed in close vicinity to a human body are used, such as health and medical care. The institute of electrical and electronics engineers (IEEE) 802 LAN/MAN Standards Committee proposed the 802.15.6 standard protocol for the purpose of low-power local area wireless communication for Body Area Network (BAN) applications.

The 802.15.6 protocol defines a physical (PHY) layer and a medium access control (MAC) sublayer for the wireless BAN (also referred to as WEAN) operating in-body, on-body, or off-body. Here, the "body" is not limited to the human body and includes bodies of animals and organisms having propagation environment similar to the human body.

According to the 802.15.6 protocol, a device belonging to a BAN serves as a hub or a node. One hub and one or more nodes form an independent network. Since a communication device, in particular, a mobile device included in the network is often powered by a small battery, it is important to reduce power consumption in order to increase device operating time of the device.

As an example of a technology for saving the battery life, Japanese Patent Application Laid-Open Publication No. 2012-519439 published on Aug. 23, 2012, discloses a wireless sensor network including a device for determining a suitable sleep pattern based on detected parameter values and a current battery charge level and transmitting the sleep pattern to a different device included in the network, which controls its operation based on the sleep pattern.

SUMMARY OF THE INVENTION

The hub operating in beacon mode should send one or more beacon signals in every active beacon period (superframe). Conventionally, according to the IEEE 802.15.6 protocol, a beacon frame contains a large amount of information required when the node and the hub communicate with each other, such as MAC capability. The MAC Capability contained in the beacon frame includes information on a collision avoidance scheme supported by the hub. In the case that the node can support only one of two collision avoidance schemes of CSMA/CA and Slotted Aloha, the information on the collision avoidance scheme supported by the hub is not meaningful information because the node will respond by a scheme which it supports regardless of the collision avoidance scheme supported by the hub. Further, even in the case that the collision avoidance scheme of the hub is the same as that of the node, the hub sometimes cannot respond to a connection request of the node (for example, the hub rejects the connection request according to its state). In such cases, some kinds of information contained in the beacon frame sent by the hub are just a cause of wasteful power consumption.

An object of the present invention is to provide a communication method for reducing power consumed for a connection process between two communication devices, and a device, a system, and a computer readable recording medium for recording a program for implementing the communication method.

According to one aspect of the invention, there is provided a device for communication according to a specific communication protocol. The device includes a processor for generating and processing frames based on frame formats defined by the communication protocol. The processor generates a beacon frame so that information on a collision avoidance scheme supported by the device of a plurality kinds of information specified based on the communication protocol is omitted. The processor processes a connection request frame transmitted from other device to extract information on a collision avoidance scheme supported by the other device, and controls communication with the other device based on comparison of the extracted information on the collision avoidance scheme with the information on the collision avoidance scheme supported by the device.

According to one aspect of the invention, there is provided a device for communication according to a specific communication protocol. The device includes a processor for generating and processing frames based on frame formats defined by the communication protocol. In the case that a frame transmitted from other device is a beacon frame, the processor determines whether or not the beacon frame includes discrimination information indicating that information on a collision avoidance scheme of the other device is omitted. The processor controls communication with the other device based on the determination.

According to some embodiments of the invention, it is possible to reduce power consumption of terminals associated with the communication connection process.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention. Here.

DETAILED DESCRIPTION OF THE PREFERRED EMBODIMENT

In the present specification, the invention will be mainly described in connection with embodiments in which it has been applied to the BAN but its application field is not limited to the BAN. For example, the invention can be applied to different wireless communication technologies such as Bluetooth (Registered Trademark), Wi-Fi (Registered Trademark), and Wi-Fi Direct (Registered Trademark).

Hereinafter, embodiments of the present invention will be described with reference to the accompanying drawings. The scope of the invention is not intended to be limited to the illustrated examples.

Figure 1:
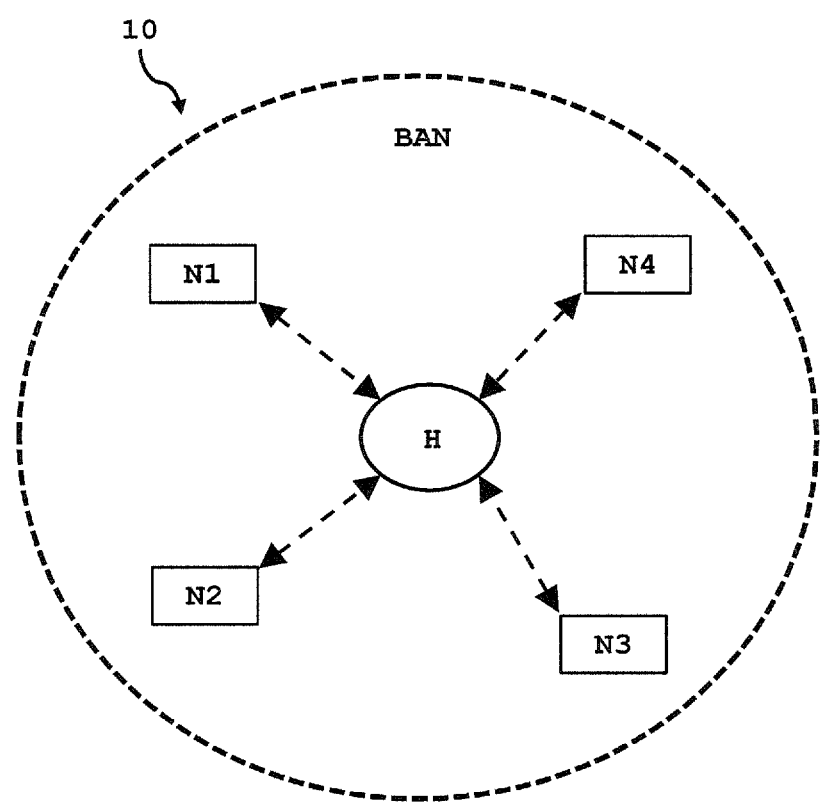
FIG. 1 is a diagram showing a topology of a body area network (BAN).

FIG. 1 is a diagram showing a topology of the body area network (BAN). The BAN 10 includes a device, which plays the role of a hub H, and one or more devices each of which plays the role of a node N. There is to be one and only one hub in a BAN, whereas the number of nodes in the BAN is to range from zero to the maximum number of nodes connectable to the hub (mMaxBANSize). In the example shown in FIG. 1, four nodes N1 to N4 belong to the BAN 10, but the number of nodes is not limited to this example. The hub H is a mobile terminal such as a smart phone or a personal digital assistant (PDA), or an electronic timepiece provided with a communication function, for example. The node N is a bio-signal measuring device, a bio-signal monitoring device or a sensor for measuring/receiving bio-signals and transmitting to the hub, or an electronic timepiece including one or more of them, for example.

Figure 2:
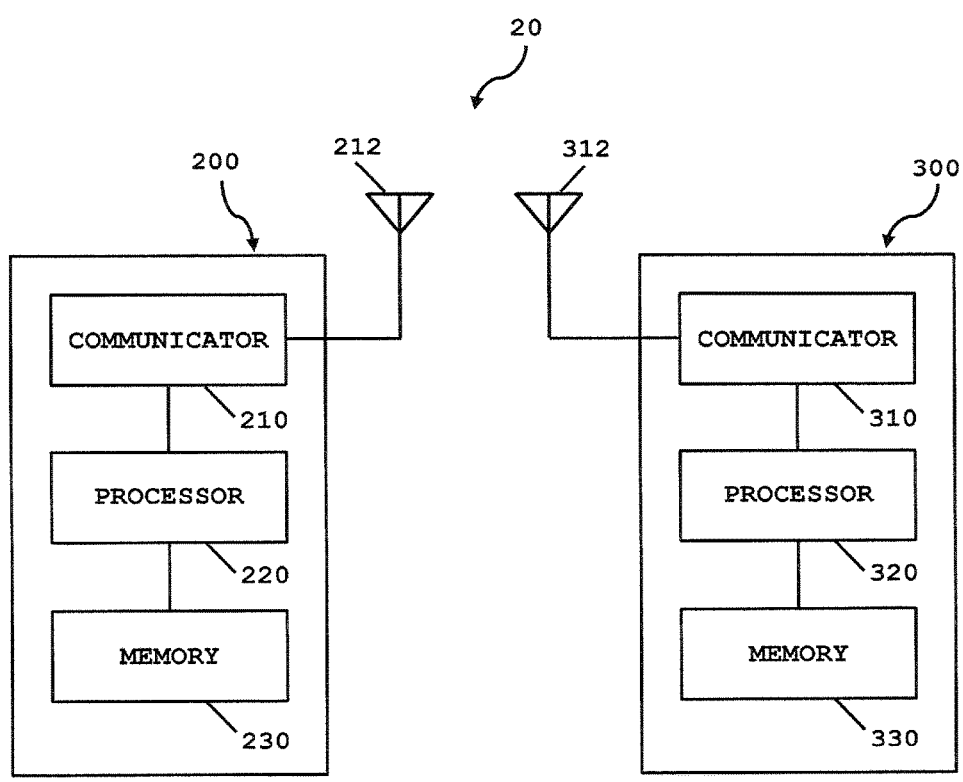
FIG. 2 is a block diagram showing a communication system according to an embodiment of the invention.

FIG. 2 is a block diagram showing a communication system according to an embodiment of the invention. In the present embodiment, a communication system 20 includes a device 200 serving as a hub and a device 300 serving as a node. Although the example of FIG. 2 depicts one node communicating with the hub, the number of node(s) connectable to the hub is not limited to this example. The device 200 communicates with one or more nodes and controls them. The device 300 is a low-power wireless node operating in, on, or around the body (not limited to the human body) for one or more applications such as a medical device, an electronic appliance, or a personal amusement device.

The device 200 includes a communicator 210, a processor 220, and a memory 230. The processor 220 processes messages exchanged via an antenna 212 and the communicator (or, a transceiver) 210 and/or via a wireline connected to the internet or a different body area network (not shown in the drawings). The antenna 212 transmits and receives electromagnetic waves of a frequency corresponding to a wireless communication method adopted by the processor 220. The communicator 210 includes a circuit for transforming an electric signal input from the processor 220 into an electromagnetic wave or transforming a received electromagnetic wave into an electric signal to output it to the processor 220. These electric signals are transmitted and received on a frame-by-frame basis. In the present embodiment, the processor 220 generates a frame to be transmitted to other device, for example, the device 300, according to the BAN protocol, and processes (for example, decodes) a frame received from other device, for example, the device 300, according to the BAN protocol. The processor 220 may include software, firmware, hardware, or a combination thereof.

The memory 230 can be used to store data such as frame structure information, medium access control information, and power management information, as well as data of frames transmitted or received (hereinafter, referred to as "frame data"). In particular, information on history of connections between the device 200 and other devices (hereinafter, referred to as "history information") can be stored in the memory 230. The history information may include information recorded in a MAC frame received from other device. The information recorded in the MAC frame includes MAC Capability and PHY Capability of the other device, for example. Further, the memory 230 may also be used to store computer program instructions, software and/or firmware executed by the processor 220. The memory 230 may be any storage device such as a RAM (Random Access Memory), a ROM (Read Only Memory), a flash memory, or a disk drive integrated into or removable from the communication device 200. Alternatively, the memory 230 may be any storage device integrated into or removable from the processor 220.

The device 300 includes a communicator 310, a processor 320, and a memory 330. The processor 320 processes messages exchanged via an antenna 312 and the communicator (or, a transceiver) 310. The antenna 312 transmits and receives electromagnetic waves of a frequency corresponding to a wireless communication method adopted by the processor 320. The communicator 310 includes a circuit for transforming an electric signal input from the processor 320 into an electromagnetic wave or transforming a received electromagnetic wave into an electric signal to output it to the processor 320. In the present embodiment, the processor 320 generates a frame to be transmitted to other device, for example, the device 200, according to the BAN protocol, and processes a frame received from other device, for example, the device 200, according to the BAN protocol. The processor 320 may include software, firmware, hardware, or a combination thereof.

The memory 330 can be used to store data such as the frame structure information, the medium access control information and the power management information, as well as the frame data transmitted or received. In particular, information recorded in a MAC frame received from other device, for example, the device 200 can be stored in the memory 330. The information recorded in the MAC frame includes MAC Capability of the other device, for example. Further, the memory 330 may also be used to store computer program instructions, software and/or firmware executed by the processor 320. The memory 330 may be any storage device such as a RAM (Random Access Memory), a ROM (Read Only Memory), a flash memory, or a disk drive integrated into or removable from the communication device 300. Alternatively, the memory 330 may be any storage device integrated into or removable from the processor 320.

The device 200 or 300 can be connected to a sensor (now shown in the drawings) used to monitor data from the body such as body temperature, respiration, heart rate, or blood sugar, or a device (now shown in the drawings) for providing a function of controlling a pace maker, a respirator, an insulin pump, or the like, for example.

The network 10 shown in FIG. 1 and the system 20 shown in FIG. 2 are merely examples and do not limit the scope of systems or devices capable of implementing frame generating methods or frame processing methods described herein. Any device for performing communication according to the present invention falls within the scope of the invention.

Figure 3:
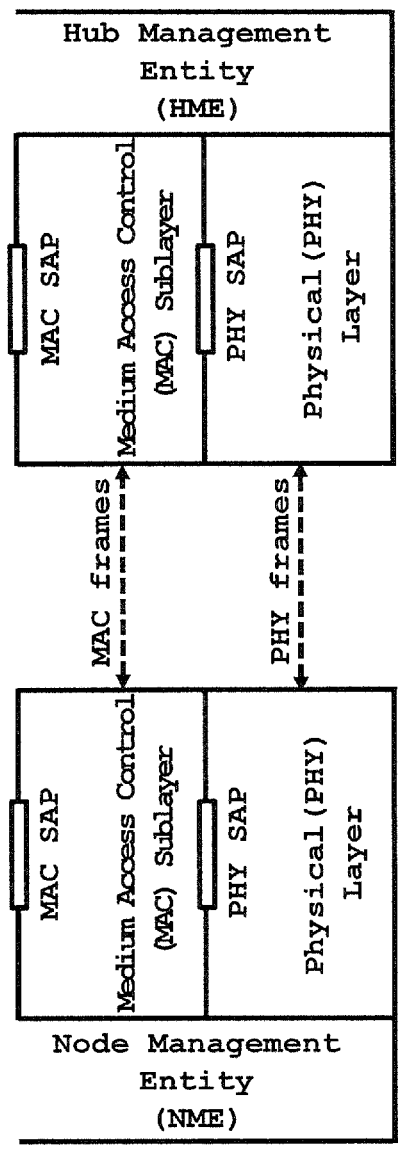
FIG. 3 is a diagram showing a physical (PHY) layer and a medium access control (MAC) sublayer in a hub or a node.

The hub 200 or the node 300 is internally partitioned into a physical (PHY) layer and a medium access control (MAC) sublayer. FIG. 3 is a diagram showing the PHY layer and the MAC sublayer according to the ISO/OSI-IEEE 802 reference model. Direct communications between the node and the hub are to transpire at the PHY layer and the MAC sublayer. In the present embodiment, the PHY layer and the MAC sublayer of the node or the hub are to use only one operating channel at any given time. However, the present invention is not limited thereto.

Within the node or the hub, the MAC provides its service to the MAC client (higher layer) through the MAC service access point (SAP) located immediately above the MAC sublayer, while the PHY provides its service to the MAC through the PHY SAP located between them. On transmission, the MAC client passes MAC service data units (MSDUs) to the MAC sublayer via the MAC SAP, and the MAC sublayer passes MAC frames (also known as MAC protocol data units or MPDUs) to the PHY layer via the PHY SAP. On reception, the PHY layer passes MAC frames to the MAC sublayer via the PHY SAP, and the MAC sublayer passes MSDUs to the MAC client via the MAC SAP.

Figure 4:
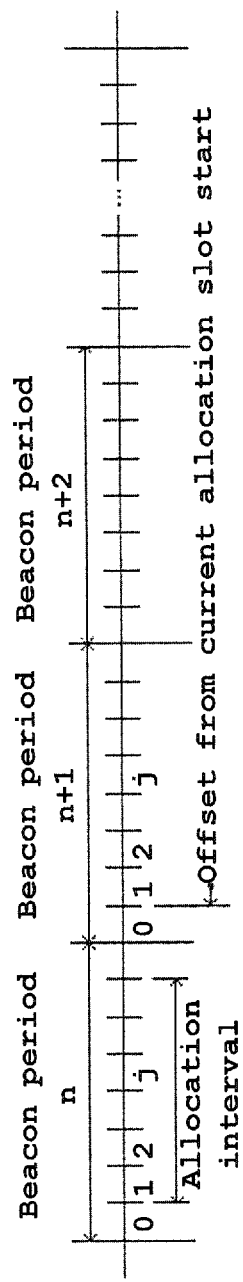
FIG. 4 is a diagram showing a time reference base of the BAN.

In the following, the medium access will be described referring to FIGS. 4 and 5. All nodes and hubs are to establish a time reference base, as shown in FIG. 4, if their medium access is to be scheduled in time. To provide or support time referenced allocations in its BAN, the hub shall establish a time base, which divides the time axis into beacon periods (superframes) regardless of whether it is to transmit beacons. Each beacon period is composed of allocation slots of equal length and numbered from 0, 1, . . . , s, where s≤255. In such cases, the hub shall transmit a beacon in each beacon period (superframe), except in inactive superframes, or shall not transmit a beacon in any superframe. A beacon is a frame transmitted by the hub in order to let nodes know existence of the network of the hub and make the nodes participate in the network. Further, the beacon is transmitted by the hub to facilitate network management, such as the coordination of medium access and power management of the nodes in the body area network (BAN) of the hub, and to facilitate clock synchronization therein.

According to the IEEE 802.15.6 protocol, the hub shall operate in one of the following three access modes.

(1) Beacon mode with beacon periods (superframes): The hub shall transmit a beacon in each beacon period except in inactive superframes to enable time referenced allocations.

(2) Non-beacon mode with superframes: The hub shall transmit no beacons although access to the medium involves time referencing and superframes and allocation slots are established. In this mode, the hub may have only a managed access phase (MAP) in any superframe.

(3) Non-beacon mode without superframes: Access to the medium involves no time referencing and the hub shall transmit no beacons.

Figure 5:
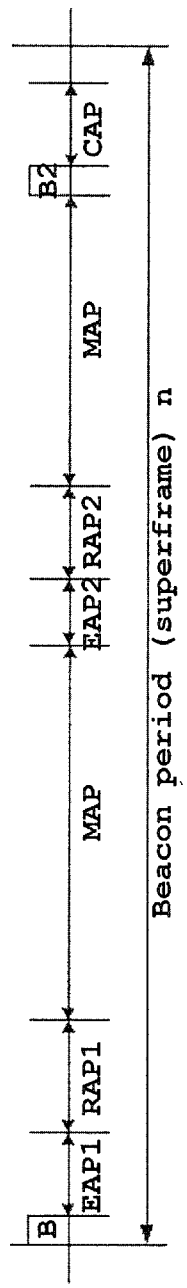
FIG. 5 is a layout of access phases in a beacon period for beacon mode.

FIG. 5 is a layout of access phases in a beacon period for beacon mode. In beacon mode, the hub shall organize access phases in each active beacon period (superframe) as shown in FIG. 5. In FIG. 5, B stands for beacon (B). In an active superframe (beacon period), the hub shall transmit a beacon and may provide access phases. Access phases are used to exchange management, control, and data type frames. In an inactive superframe (beacon period), the hub shall not transmit any beacon and shall not provide any access phases.

The hub shall place exclusive access phase 1 (EAP1), random access phase 1 (RAP1), managed access phase (MAP), exclusive access phase 2 (EAP2), random access phase 2 (RAP2), another managed access phase (MAP), and contention access phase (CAP) in the order shown in FIG. 5. To provide a non-zero length CAP, the hub shall transmit a preceding B2 frame. The hub shall not transmit a B2 frame if the CAP that follows has a zero length.

In a distributed environment which a concentrated controller is not used, such as the BAN, all stations (a hub terminal and node terminal(s)) contend for access to a channel. In the case that two or more stations use one channel simultaneously, communication is impossible due to collision of signals. In order to prevent such collision, the BAN supports contention access based on one of "Carrier Sense Multiple Access with Collision Avoidance (CSMA/CA)" and "Slotted Aloha". By the contention access, the node obtains a time interval for initiating communication of one or more frames in the contention access phase (CAP). The hub or node supports at least one of CSMA/CA and Slotted Aloha as a scheme for avoiding collision for the contention access or random access. A beacon frame conveys information on functions supported by the hub including the collision avoidance scheme to a node and let the node know the start of a superframe for synchronization of the hub and the node.

CSMA/CA is a scheme in which a node having data to transmit tries to transmit the data after waiting a time interval corresponding to a predetermined number of slots in a set contention window (CW). Slotted Aloha is a scheme in which a channel is divided into time slots and each node can transmit data only in the start of the time slot to reduce a risk of collision.

Figure 6:
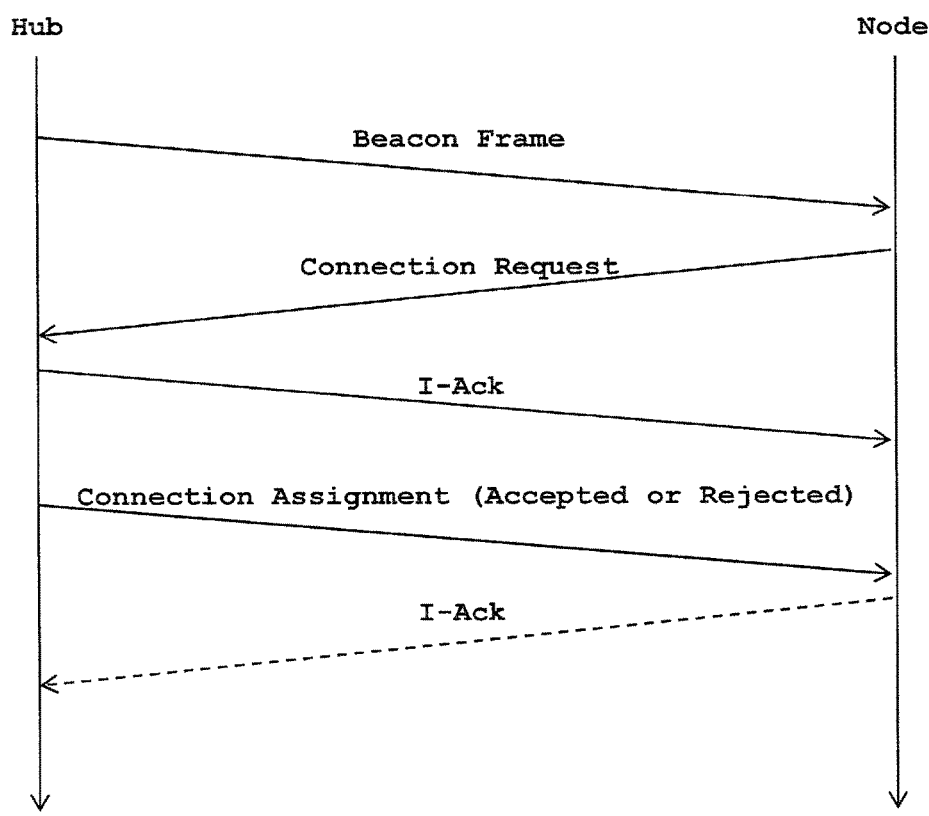
FIG. 6 shows a connection procedure between a node and a hub.

FIG. 6 is a signal flow diagram showing a conventional connection procedure between a node and a hub. As shown in FIG. 6, a node unconnected to a hub receives the beacon frame sent from the hub, and the node acquires various kinds of information on a superframe and a network of the hub from the received beacon frame. The information includes a network ID (the BAN ID, in the present embodiment) which is identification information unique to the network and the address of the hub contained in the header of the beacon frame, and MAC Capability contained in the payload of the beacon frame. The node generates a Connection Request frame based on the acquired information and transmits it to the hub. The Connection Request frame is a frame transmitted by the node to request creation or modification of a connection with the hub. If the hub receives the Connection Request frame from the node, the hub transmits to the node an I-Ack (Immediate Acknowledgement) frame for acknowledging successful receipt of the frame. Then, the hub generates a Connection Assignment frame and transmits it to the node. The Connection Assignment frame is a frame transmitted by the hub to respond to a connection request or to initiate or change a connection assignment. The Connection Assignment frame contains information indicating whether or not the connection request of the node is accepted.

In the case that the hub accepts the connection request of the node, the node transmits an I-Ack frame to the hub after receiving the Connection Assignment frame from the hub. By this, the node and the hub are connected and become to be able to communicate necessary information (data) with each other. On the other hand, in the case that the hub does not accept the connection request of the node, the node transmits no more frames to the hub and the connection procedure ends.

In the following, a MAC frame structure of each of a beacon frame, a Connection Request frame, and a Connection Assignment frame used for BAN communication will be described in detail. A format of a MAC frame according to the present embodiment is shown in (A) of FIG. 7. The MAC frame includes a fixed-length MAC header, a variable-length MAC frame body, and a fixed length Frame Check Sequence (FCS) field. The Frame Check Sequence (FCS) field is the footer of the MAC frame. The fields contained in the MAC frame will be defined in the following. Each of the figures explained below depicts the fields contained in the MAC frame from left to right in the transmit order, with fields that are optional or selectively absent drawn in dashes. Also indicated is the number of octets contained in each field along with the corresponding octet transmit order, on top of the field. Reserved fields are set to zero on transmission and ignored on reception.

Figure 7:
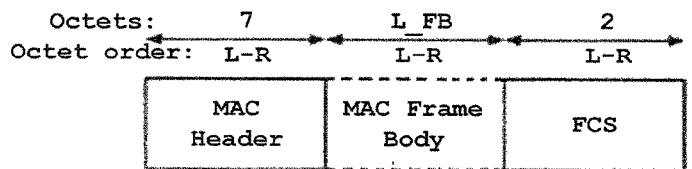
FIG. 7 shows (A) a format of a MAC frame, (B) a format of MAC header, (C) a format of a Frame Control field, and (D) a format of a MAC frame body.
Figure 7:
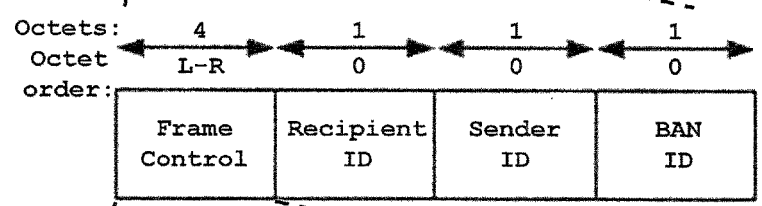
Figure 7:
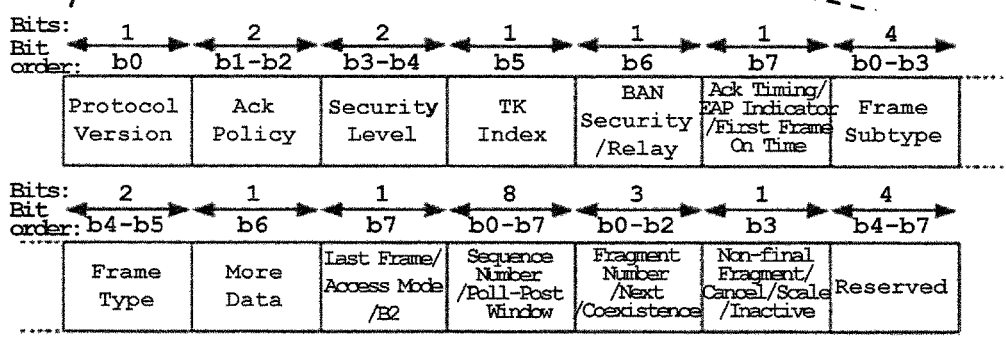
Figure 7:
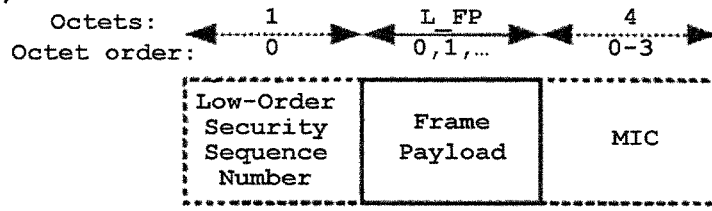

A format of the MAC header according to the present embodiment is shown in (B) of FIG. 7. The MAC header includes Frame Control, Recipient ID, Sender ID, and BAN ID fields. The Frame Control will be described in the following. The Recipient ID field is set to the abbreviated address (i.e., NID (Node Identifier) or HID (Hub Identifier)) of the recipient of the current frame. The Sender ID field is set to the abbreviated address (i.e., NID or HID) of the sender of the current frame. The BAN ID field is set to the abbreviated address of the BAN in which the current frame is transferred.

A format of the Frame Control according to the present embodiment is shown in (C) of FIG. 7. Each field of the Frame Control is defined in Section 5.2.1.1 of IEEE Std 802.15.6-2012. Frame Subtype and Frame Type fields of the Frame Control are set to indicate the type of the current frame according to Table 1 below.

TABLE 1

Frame Type and Frame Subtype field encoding

| Frame Type value b5b4 | Frame Type name | Frame Subtype value b3b2b1b0 | Frame Subtype name |
|---|---|---|---|
| 00 | Management | 0000 | Beacon |
| 00 | Management | 0001 | Reserved |
| 00 | Management | 0010 | Security Association |
| 00 | Management | 0011 | Security Disassociation |
| 00 | Management | 0100 | PTK |
| 00 | Management | 0101 | GTK |
| 00 | Management | 0110-0111 | Reserved |
| 00 | Management | 1000 | Connection Request |
| 00 | Management | 1001 | Connection Assignment |
| 00 | Management | 1010 | Disconnection |
| 00 | Management | 1011-1110 | Reserved |
| 00 | Management | 1111 | Command |
| 01 | Control | 0000 | I-Ack |
| 01 | Control | 0001 | B-Ack |
| 01 | Control | 0010-0011 | Reserved |
| 01 | Control | 0100 | I-Ack + Poll |
| 01 | Control | 0101 | B-Ack + Poll |
| 01 | Control | 0110 | Poll |
| 01 | Control | 0111 | T-Poll |
| 01 | Control | 1000-1101 | Reserved |
| 01 | Control | 1110 | Wakeup |
| 01 | Control | 1111 | B2 |
| 10 | Data | 0000 | User Priority 0 or Allocation Mapped Data Subtype |
| 10 | Data | 0001 | User Priority 1 or Allocation Mapped Data Subtype |
| 10 | Data | 0010 | User Priority 2 or Allocation Mapped Data Subtype |
| 10 | Data | 0011 | User Priority 3 or Allocation Mapped Data Subtype |
| 10 | Data | 0100 | User Priority 4 or Allocation Mapped Data Subtype |
| 10 | Data | 0101 | User Priority 5 or Allocation Mapped Data Subtype |
| 10 | Data | 0110 | User Priority 6 or Allocation Mapped Data Subtype |
| 10 | Data | 0111 | Emergency |
| 10 | Data | 1000-1111 | Allocation Mapped Data Subtype |
| 11 | Reserved | 0000-1111 | Reserved |

As shown in Table 1, the value of the Frame Type indicates the type of the current frame. More specifically, in the case that the value of the Frame Type is 00, the current frame is a Management frame. In the case that the value of the Frame Type is 01, the current frame is a Control frame. In the case that the value of the Frame Type is 10, the current frame is a Data frame. In the case that the value of the Frame Type is 11, the current frame is a Reserved frame. The value of the Frame Subtype is set according to the subtype of the current frame. Thus, the combination of the Frame Type value and the Frame Subtype value indicates the kind of the current frame. For example, in the case that the Frame Type value is 00 and the Frame Subtype value is 0000, the current frame is a beacon frame. In the case that the Frame Type value is 00 and the Frame Subtype value is 1000, the current frame is a Connection Request frame. In the case that the Frame Type value is 00 and the Frame Subtype value is 1001, the current frame is a Connection Assignment frame. In the case that the Frame Type value is 01 and the Frame Subtype value is 0000, the current frame is an I-Ack frame.

A format of the MAC frame body according to the present embodiment is shown in (D) of FIG. 7. Low-Order Security Sequence Number and Message Integrity Code (MIC) fields are not present in unsecured frames, as indicated by the Security Level field of the MAC header of the current frame. Frame Payload is a sequence of fields to be communicated to the recipient(s). An I-Ack frame transmitted by a node to a hub contains no Frame Payload. An I-Ack frame transmitted by a hub to a node selectively contains a Frame Payload.

Figure 8:
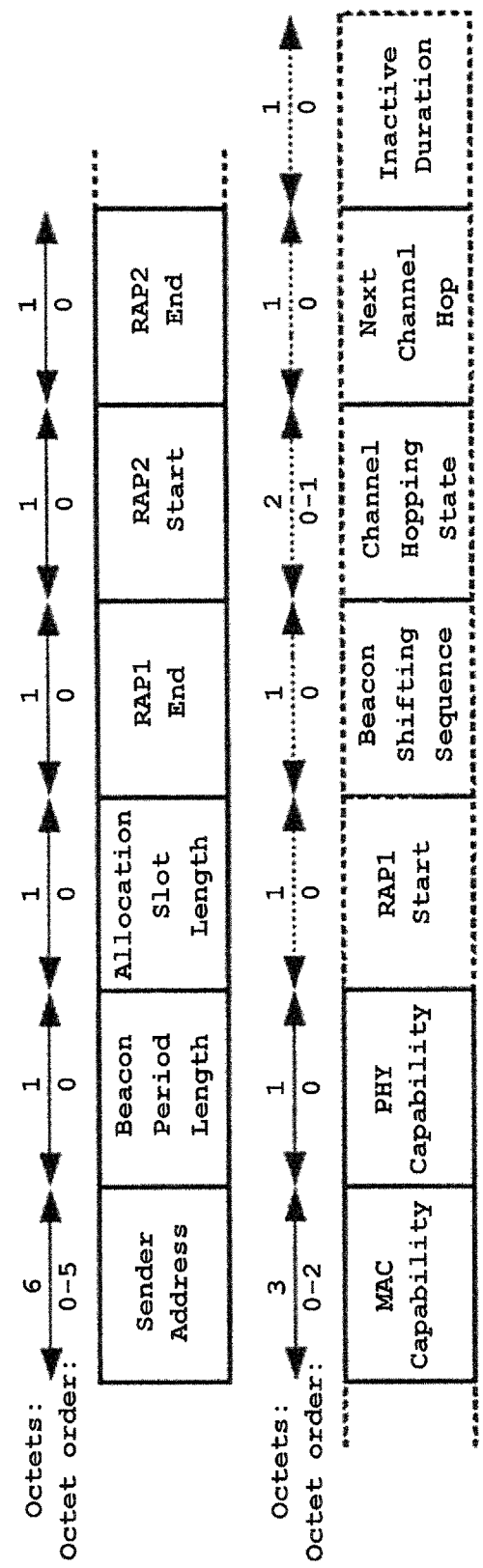
FIG. 8 shows a format of a frame payload of a beacon frame.

The beacon frame contains a frame payload that is formatted as shown in FIG. 8, according to the present embodiment. Each field of the frame payload of the beacon frame is defined in Section 5.3.1 of IEEE Std 802.15.6-2012. RAPT Start, Beacon Shifting Sequence, Channel Hopping State, Next Channel Hop, and Inactive Duration of a plurality of fields of the frame payload of the beacon frame are optional data which are present under predetermined conditions.

Figure 9:
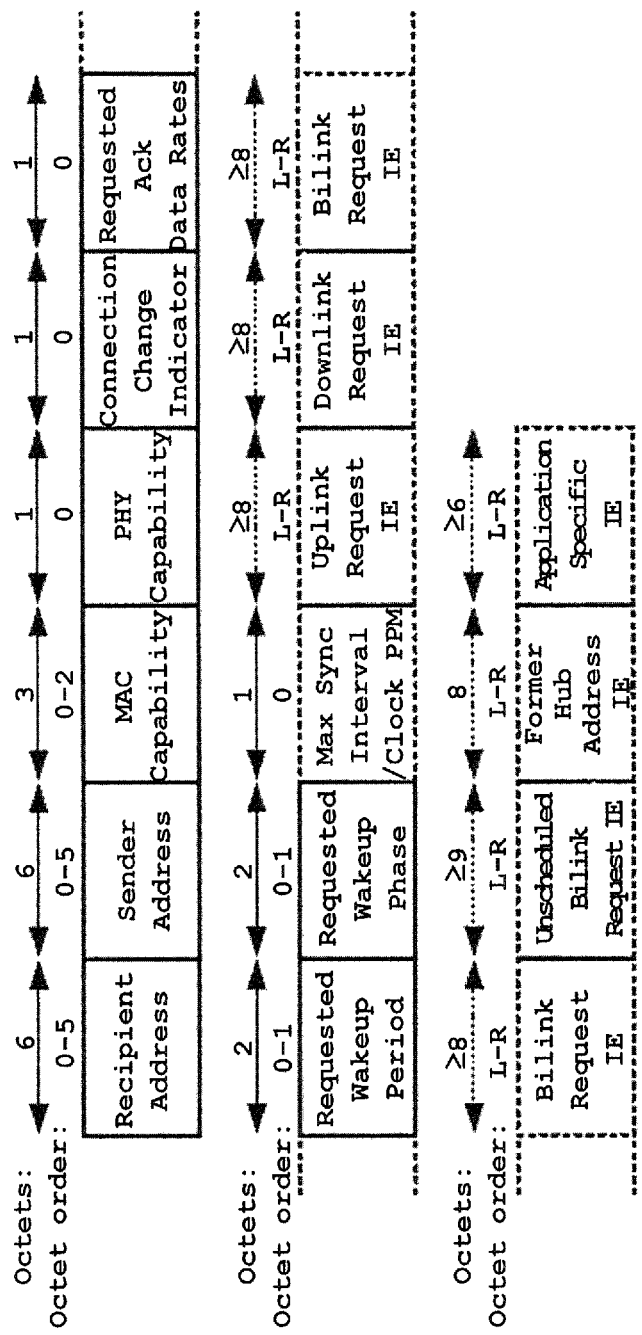
FIG. 9 shows a format of a frame payload of a Connection Request frame.

A Connection Request frame according to the present embodiment includes a frame payload formatted as shown in FIG. 9. The Recipient Address field is set to the EUI-48 (EUI: Extended Unique Identifier) of the recipient of the current frame, or is set to zero if such an EUI-48 is yet unknown. The Sender Address field is set to the EUI-48 of the sender of the current frame. The MAC Capability field contains information on functions supported by the node transmitting the Connection Request frame (for example, the collision avoidance scheme supported by the node). Each of other fields of the frame payload of the Connection Request frame is defined in Section 5.3.6 of IEEE Std 802.15.6-2012.

Figure 10:
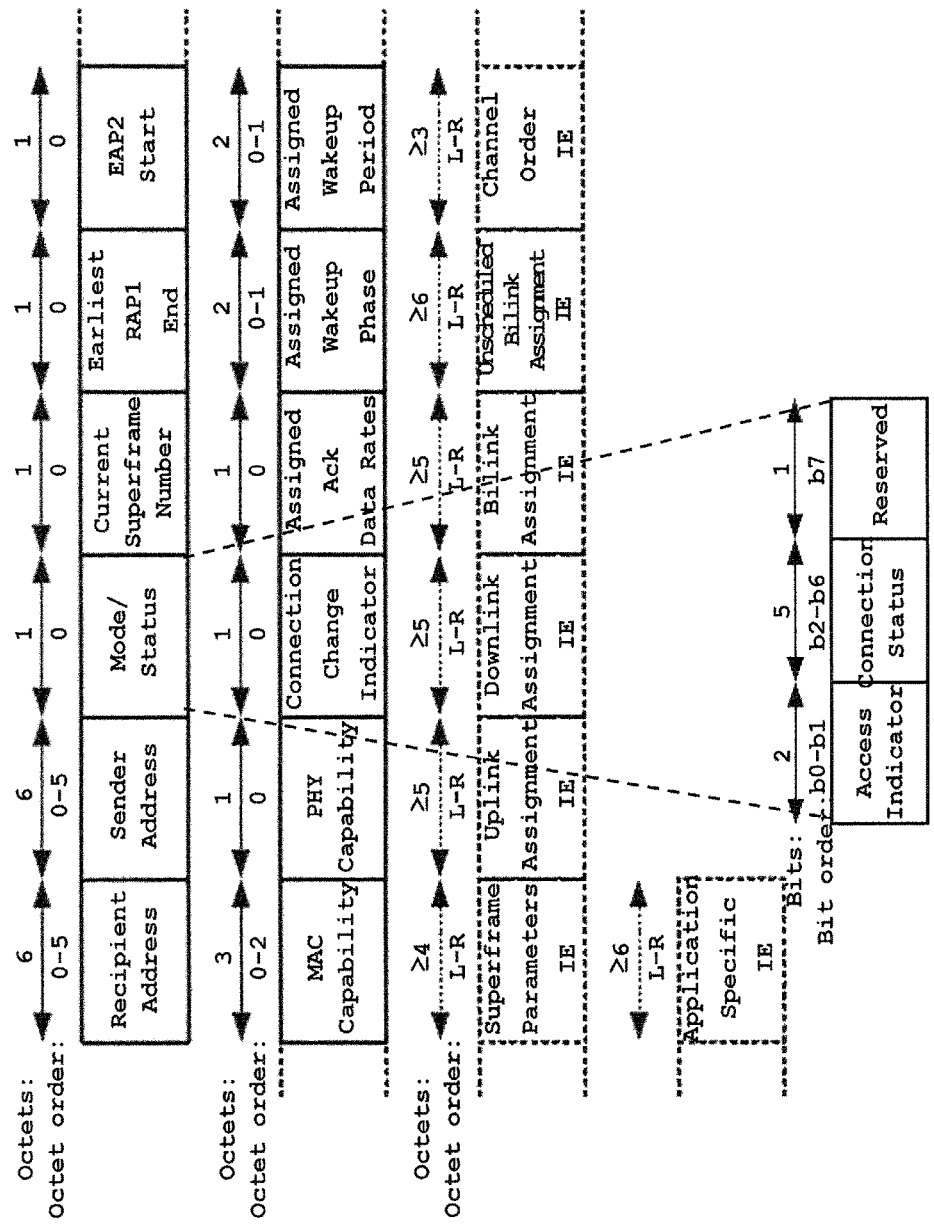
FIG. 10 shows a format of a frame payload of a Connection Assignment frame.

A Connection Assignment frame according to the present embodiment includes a frame payload formatted as shown in FIG. 10. Each of a plurality of fields included in the frame payload of the Connection Assignment frame is defined in Section 5.3.7 of IEEE Std 802.15.6-2012. The Mode/Status field of the plurality of fields is described below. The Mode/Status field shows the access mode of the hub and the status of connection assignment, and a format of the field is also shown in FIG. 10. The Access Indicator field is set to the access mode of the hub. Field values are shown in Table 2 below.

TABLE 2

Access Indicator field encoding

| Field value in decimal | Status |
|---|---|
| 0 | Beacon mode with superframes, and CSMA/CA for random access |
| 1 | Beacon mode with superframes, and slotted aloha for random access |
| 2 | Non-beacon mode with superframes, and no random access |
| 3 | Non-beacon mode without superframes, and CSMA/CA for random access |

The Connection Status field is set to the status of the connection assignment. Field values are shown in Table 3 below.

TABLE 3

Connection Status field encoding

| Field value in decimal | Status |
|---|---|
| 0 | Connection request accepted |
| 1 | Connection request rejected - due to access policy restrictions as imposed by the administrator/owner of this hub on the communications in its BAN |
| 2 | Connection request rejected - invalid or unsupported frame format |
| 3 | Connection request rejected - no unsecured communication with this hub |
| 4 | Connection request rejected - no more channel bandwidth for a new connection |
| 5 | Connection request rejected - no more Connected_NID for a new connection |
| 6 | Connection request rejected - no more internal resources for a new connection |
| 7 | Connection request rejected - node's maximum synchronization interval too long to support |
| 8 | Connection request rejected - node's clock ppm too large to support |
| 9 | Connection request rejected - beacon shifting enabled but not supported by requestor |
| 10 | Connection request rejected - channel hopping enabled but not supported by requestor |
| 11-15 | Reserved |
| 16 | Connection assignment modified |
| 17-31 | Reserved |

If the hub accepts the connection request of the node which is the sender of the Connection Request frame, the Connection Status field is set to 0. If the hub rejects the connection request, the Connection Status field is set to one of 1 to 10 according to a reason for rejection of connection. The node can determine whether its connection request is accepted or rejected from the value of the Connection Status field contained in the payload of the Connection Assignment frame received from the hub.

Figure 11:
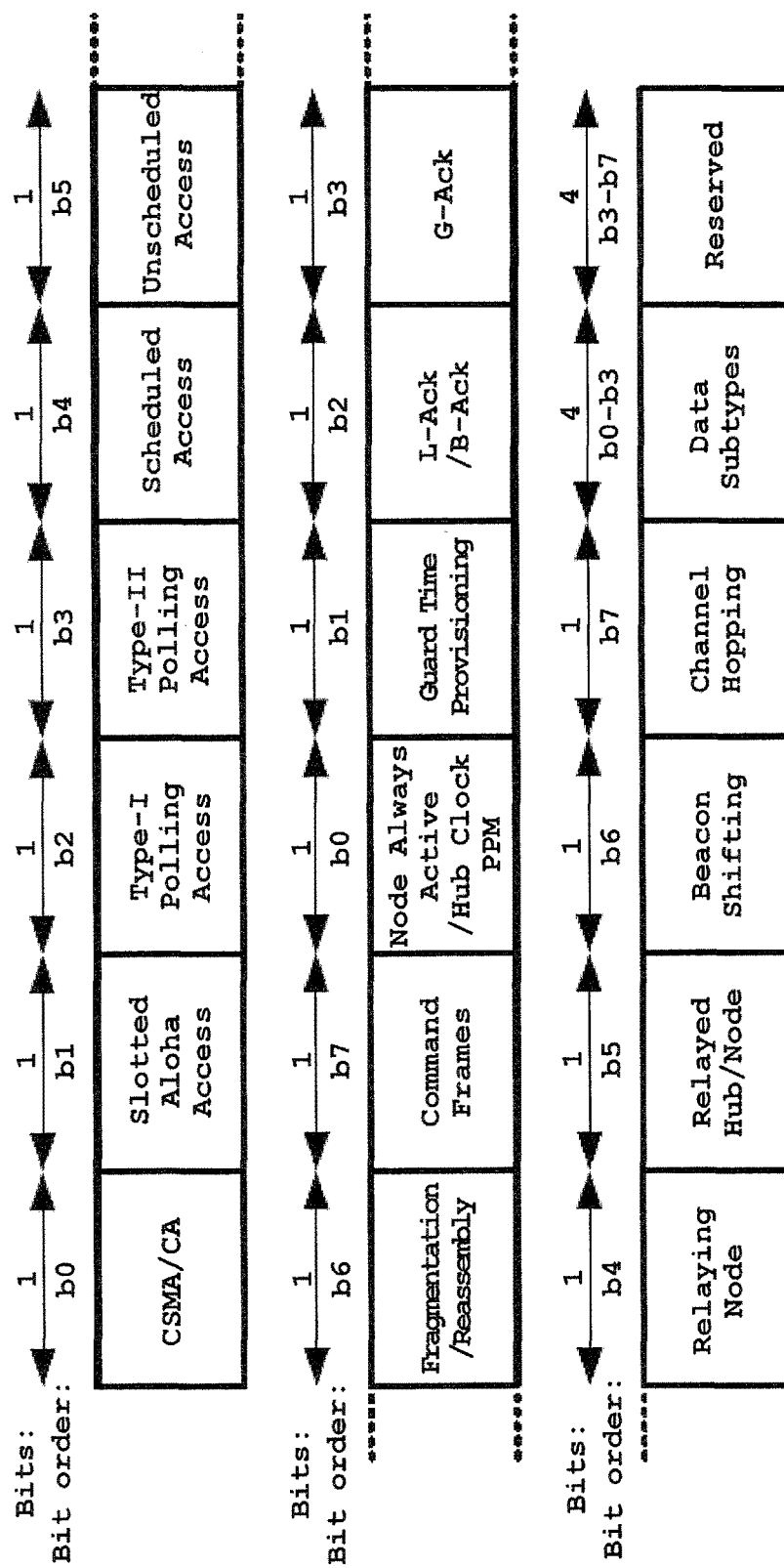
FIG. 11 shows a format of a MAC Capability field.

As shown in FIGS. 8 to 10, each of the beacon frame, the Connection Request frame, and the Connection Assignment frame includes a MAC Capability field in its payload. The MAC Capability field shows whether or not the sender of the current frame supports any of various functions and functional requirements and is formatted as shown in FIG. 11. The MAC Capability makes the recipient of the current frame know the functions supported by the sender of the current frame. Each field of the MAC Capability is defined in the following (see also Section 5.6.1 of IEEE Std 802.15.6-2012).

1) The CSMA/CA field is set to one if the sender supports contended allocations obtained by using CSMA/CA in exclusive access phase 1 (EAP1), random access phase 1 (RAP1), exclusive access phase 2 (EAP2), random access phase 2 (RAP2), and contention access phase (CAP), or is set to zero otherwise. In other words, if the sender of the current frame supports CSMA/CA as the collision avoidance scheme, the field is set to one.

2) The Slotted Aloha Access field is set to one if the sender supports contended allocations obtained by using slotted Aloha access in EAP1, RAP1, EAP2, RAP2, and CAP, or is set to zero otherwise. In other words, if the sender of the current frame supports Slotted Aloha as the collision avoidance scheme, the field is set to one.

3) The Type-I Polling Access field is set to one if the sender supports type-I polled allocations, or is set to zero otherwise.

4) The Type-II Polling Access field is set to one if the sender supports type-II polled allocations, or is set to zero otherwise.

5) The Scheduled Access field is set to one if the sender supports scheduled allocations, or is set to zero otherwise.

6) The Unscheduled Access field is set to one if the sender supports unscheduled bilink allocations, or is set to zero otherwise.

7) The Fragmentation/Reassembly field is set to one if the sender supports fragmentation and reassembly, or is set to zero otherwise.

8) The Command Frames field is set to one if the sender supports the processing and functionality of Command frames, or is set to zero otherwise.

9) The Node Always Active/Hub Clock PPM field is used as a Node Always Active field in frames sent by a node, which is set to one if the node is always in active state, or is set to zero otherwise. This field is used as a Hub Clock PPM field in frames sent by a hub, which is set to one if the hub has a clock with a minimum accuracy of ppm=mHubClockPPMLimit/2, or is set to zero if the hub has a clock with a minimum accuracy of ppm=mHubClockPPMLimit.

10) The Guard Time Provisioning field is, in frames sent by a node, set to one if the node supports and requires centralized guard time provisioning, or is set to zero if the node supports and requires distributed guard time provisioning. In frames sent by a hub, this field is reserved.

11) The L-Ack/B-Ack field is set to one if the sender supports both L-Ack and B-Ack acknowledgment, or is set to zero otherwise.

12) The G-Ack field is set to one if the sender supports group acknowledgment, or is set to zero otherwise.

13) The Relaying Node field is set to one if the sender is a node that supports the functionality required of a relaying node in a two-hop extended star BAN, or is set to zero if the sender is a node that does not support such a functionality. This field is reserved if the sender is a hub.

14) The Relayed Hub/Node field is set to one if the sender supports the functionality required of a relayed hub or node in a two-hop extended star BAN, or is set to zero otherwise.

15) The Beacon Shifting field is set to one if the sender supports beacon shifting, or is set to zero otherwise.

16) The Channel Hopping field is set to one if the sender supports channel hopping, or is set to zero otherwise.

17) The Data Subtypes field is set to the maximum number of data subtypes supported by the sender for data type frames received from the recipient of the current frame.

As described above, in the conventional BAN communication process, the hub sends the beacon frame including the MAC Capability field containing the information on the functions which it supports. In particular, the MAC Capability of the beacon frame includes fields (the CSMA/CA and Slotted Aloha Access fields) showing information on the collision avoidance scheme supported by the hub (CSMA/CA or Slotted Aloha). For example, in the case that the node can support only one of CSMA/CA and Slotted Aloha and cannot respond to the collision avoidance scheme supported by the hub, the information on the collision avoidance scheme supported by the hub is not important to the node because the connection request of the node will be rejected by the hub. As shown in FIG. 10 and Table 3, the hub can determine whether to accept or reject the connection request of the node based on information contained in the Connection Request frame received from the node. For this reason, in an embodiment of the present invention, the hub sends a beacon frame in which the information on the collision avoidance scheme is omitted (i.e. the CSMA/CA and Slotted Aloha Access fields are omitted) in each superframe. According to a more preferred embodiment of the present invention, the hub sends a beacon frame in which the MAC Capability field is omitted to reduce more power consumption of the hub.

According to the embodiment described above, the hub generates and sends the beacon frame including a payload in which the MAC Capability field is omitted from the plurality of fields specified by the beacon frame format shown in FIG. 8. Since the MAC Capability field contains a large amount of data as shown in FIG. 11, it is possible to reduce the power consumption of the hub by sending the beacon frame including the payload in which the MAC Capability field is omitted.

Figure 12:
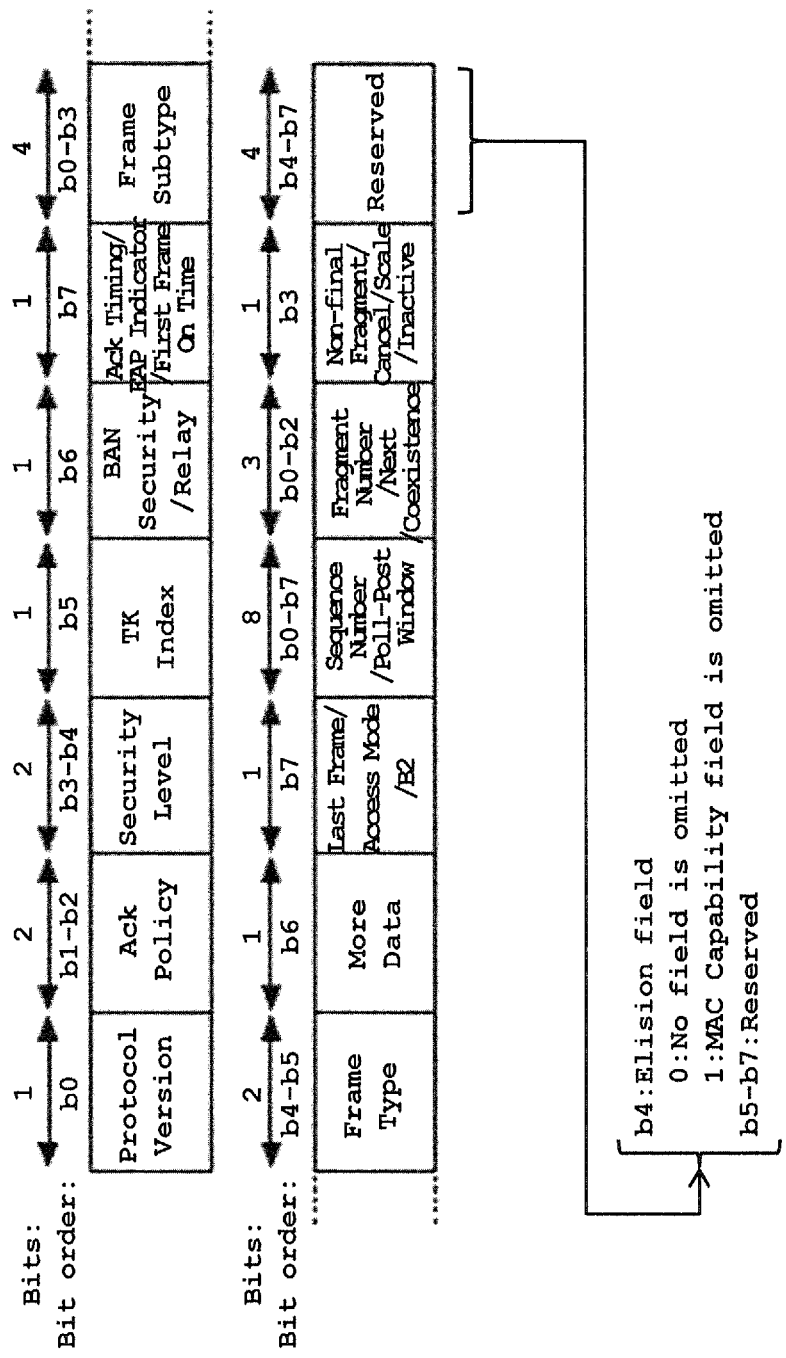
FIG. 12 shows an Elision field of a beacon frame according to an embodiment of the invention.

In the above embodiment, it is desirable to notify the node of the omission of the MAC Capability field of the beacon frame. According to an embodiment of the present invention, one bit of four bits which are reserved of the Frame Control field of the MAC header of the beacon frame (see (A) to (C) of FIG. 7) is defined as an Elision field. As shown in FIG. 12, b4 of b4-b7 bits which are reserved of the Frame Control field of the MAC header of the beacon frame is used as the Elision field in the present embodiment. If no field is omitted, the b4 field is set to zero (0). If the MAC capability field is omitted, the b4 field is set to one (1).

In the case that the node receives a beacon frame from the hub, it extracts data contained in the MAC header, the MAC frame body, and the FSC of the beacon frame, sequentially. According to the extracted value of the Elision field of the Frame Control field of the MAC header, the node determines whether or not any field is omitted in the payload of the beacon frame. In other words, the value of the Elision field is used as discrimination information indicating whether or not any field is omitted in the beacon frame. More specifically, if the value of the Elision field is zero (0), the node processes (for example, decodes) the payload of the beacon frame according to the format shown in FIG. 8. If the value of the Elision field is one (1), the node processes the payload of the beacon frame according to a format in which the MAC Capability field is omitted from the format shown in FIG. 8. By this, the node can process the payload of the beacon frame according to the discrimination information included in the header of the beacon frame.

The field used as the Elision field in the present invention is not limited to the above embodiment. While b4 of b4 to b7 bits which are reserved of the Frame Control field of the MAC header is used as the Elision field in the embodiment, a different bit (for example, one bit of b5~b7 bits) is used in other embodiments. In another embodiment, one bit in a different field of the Frame Control which is reserved is used as the Elision field. For example, the Frame Type field or the Frame Subtype field which is reserved (see Table 1) can be used as the Elision field. The kind of field used as the Elision field does not constitute the fundamental idea of the invention.

Figure 13A:
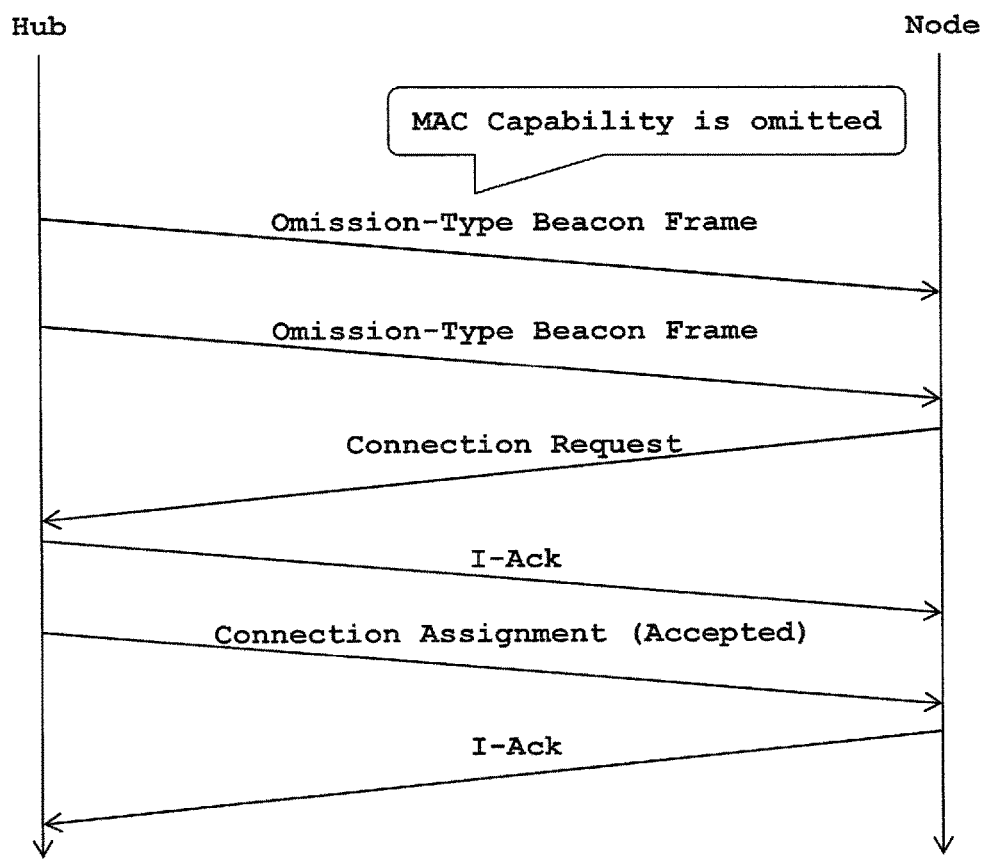
FIG. 13A is a signal flow diagram showing a connection procedure between a hub and a node according to an embodiment of the invention.
Figure 13B:
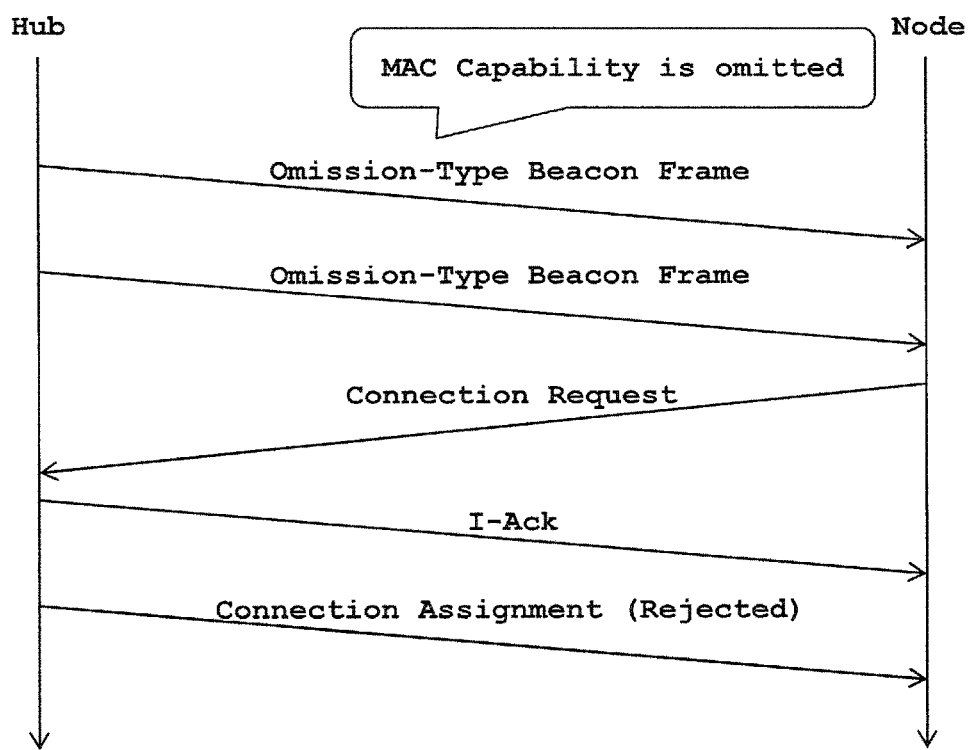
FIG. 13B is a signal flow diagram showing a connection procedure between a hub and a node according to an embodiment of the invention.

FIGS. 13A and 13B are signal flow diagrams showing connection procedures between a hub and a node according to the embodiment of the invention. FIG. 13A shows a signal flow in a case where a connection to the hub is allowable and FIG. 13B shows a signal flow in a case where the connection to the hub is unallowable. As described above, according to the present embodiment, the hub sends the beacon frame in which the MAC Capability is omitted in order to reduce more power consumption as shown in FIGS. 13A and 13B. Thus, unlike the conventional connection procedure shown in FIG. 6, the node does not acquire the MAC Capability of the hub from the beacon frame.

In the case that the beacon frame received from the hub includes the discrimination information, the node processes the payload of the beacon frame according to the format in which the MAC Capability field is omitted from the format shown in FIG. 8. The node generates a Connection Request frame based on information acquired from the beacon frame such as a network ID (the BAN ID, in the present embodiment) and the address of the hub contained in the header of the beacon frame (see (A) and (B) of FIG. 7) and transmits it to the hub. The Connection Request frame includes a frame payload formatted as shown in FIG. 9. As shown in FIG. 9, the Connection Request frame includes the MAC Capability field containing information on the collision avoidance scheme which the node supports. If the hub receives the Connection Request frame, the hub transmits to the node an I-Ack (Immediate Acknowledgement) frame for acknowledging successful receipt of the frame. The hub processes the Connection Request frame received from the node to check the collision avoidance scheme which the node supports and compares it with the collision avoidance scheme supported by itself to determine whether to accept the connection request of the node.

In the case that the collision avoidance schemes are the same and there is no other reason for rejection of connection, the hub generates a Connection Assignment frame and transmits it to the node as shown in FIG. 13A. The Connection Assignment frame includes a frame payload formatted as shown in FIG. 10. In this case, the Connection Status field of the Mode/Status field of the Connection Assignment frame is set to 0 (Connection Request Accepted) as shown in Table 3. Further, the Connection Assignment frame notifies the node of information required for communication such as the MAC Capability including communication schemes supported by the hub. If the node receives the Connection Assignment frame from the hub, the node transmits an I-Ack frame to the hub. By this, the node and the hub are connected and become to be able to communicate necessary information (data) with each other.

On the other hand, in the case that the hub determines that the collision avoidance scheme of the hub is not the same as that of the node, the hub does not accept the connection request of the node. In this case, the hub transmits an I-Ack frame and a Connection Assignment frame in which the Connection Status field of the Mode/Status field is set to 1 to the node, as shown in FIG. 13B. If the Connection Assignment frame is received, the node determines that the connection is impossible and ends the connection procedure.

In the case that the collision avoidance schemes are the same but there is any other reason for rejection of connection as shown in Table 3, the hub generates a Connection Assignment frame in which the Connection Status field of the Mode/Status field is set to one of 1 to 10 according to the reason for rejection and transmits it to the node.

Figure 14A:
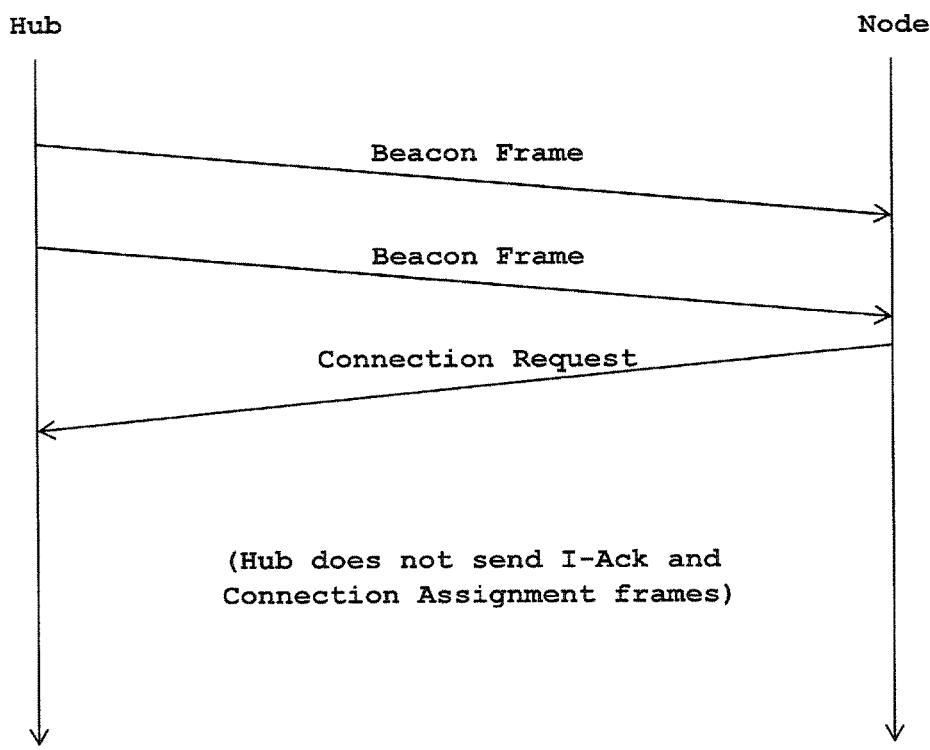
FIG. 14A is a signal flow diagram showing a connection procedure between a hub and a node according to an embodiment of the invention.
Figure 14B:
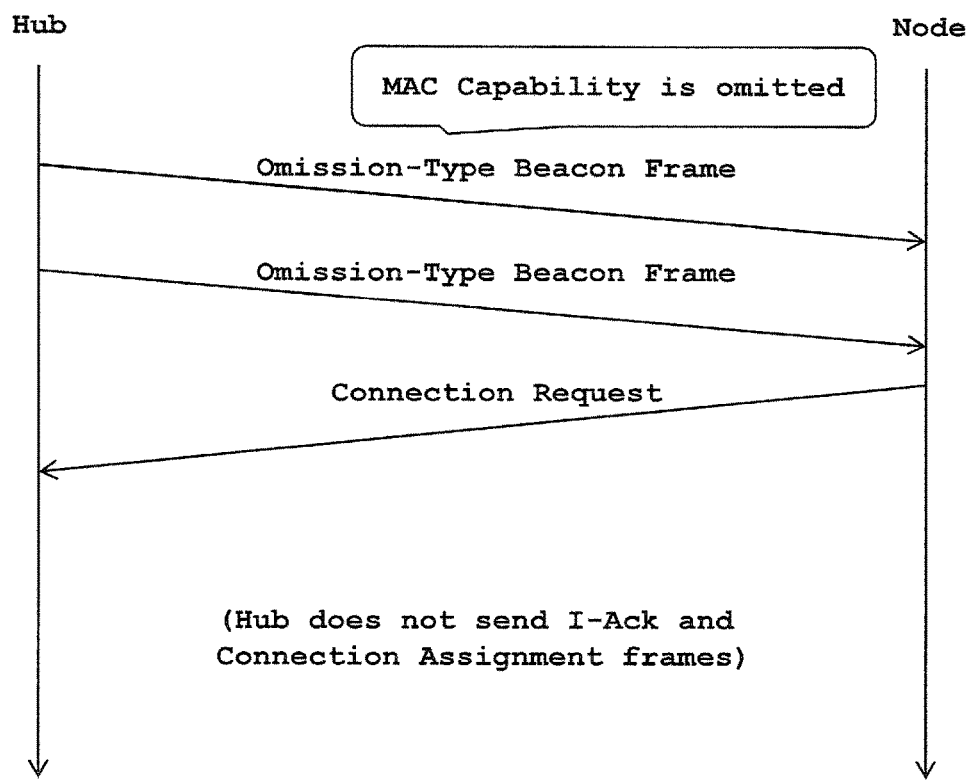
FIG. 14B is a signal flow diagram showing a connection procedure between a hub and a node according to an embodiment of the invention.

FIGS. 14A and 14B are signal flow diagrams showing connection procedures between a hub and a node according to embodiments different from the embodiment shown in FIG. 13B. First, in the embodiment shown in FIG. 14A, the hub generates the beacon frame including the payload formatted as shown in FIG. 8 and sends it. Thus, the beacon frame includes the MAC Capability field. If the node receives the beacon frame, the node transmits the Connection Request frame to the hub. Unlike the embodiment shown in FIG. 13B, the hub operates in a low-power mode in which it does not send the I-Ack frame for the Connection Request frame and the Connection Assignment frame in the case that the hub rejects the connection request of the node which transmitted the Connection Request frame. If no I-Ack frame for the Connection Request frame is received for a predetermined time period, the node determines that the hub does not accept the connection request and ends a reception standby state. The predetermined time period is a time period allocated via a Poll in the unconnected state, i.e. unconnected polled allocation, for example. According to the present embodiment, the hub does not generate and send the I-Ack frame for the Connection Request frame and the Connection Assignment frame for notifying that the connection is unallowable, and the node ends the reception standby state after the predetermined time period elapses. Thus, power consumption of the hub and the node can be reduced.

In the embodiment shown in FIG. 14B, the hub and the node operate in the low-power mode in the same way as the embodiment shown in FIG. 14A, and the beacon frame in which the MAC Capability field is omitted is used. By this, it is also possible to reduce power required for the hub to send beacon frames. Further, it is desirable to include the discrimination information indicating the omission of the MAC Capability field in the beacon frame sent by the hub. If the node receives the beacon frame, the node processes the payload of the received beacon frame according to the format in which the MAC Capability field is omitted from the format of the payload of the beacon frame shown in FIG. 8. If no I-Ack frame for the Connection Request frame is received for a predetermined time period (for example, the unconnected polled allocation), the node determines that the connection to the hub is impossible and ends the reception standby state.

According to the embodiments shown in FIGS. 14A and 14B, the node determines that the connection to the hub is impossible and ends the reception standby state in the case that the node receives no I-Ack frame from the hub within the predetermined time period after sending the Connection Request frame. In other embodiments, the hub operates in the low-power mode in which it does not send the I-Ack frame for the Connection Request frame and the Connection Assignment frame (as shown in FIGS. 14A and 14B) in the case that the node cannot respond to the collision avoidance scheme supported by the hub, while the hub sends the I-Ack frame for the Connection Request frame and the Connection Assignment frame (as shown in FIG. 13B) in the case that the collision avoidance schemes are the same but there is any other reason for rejection of connection. In another embodiment, the hub sends the I-Ack frame for the Connection Request frame but does not send the Connection Assignment frame in the case that the hub does not accept the connection request. In this case, if the Connection Assignment frame is not received within a predetermined time period, the node determines that the connection to the hub is impossible and ends the reception standby state. Further, the field to be omitted is not limited to the MAC Capability field. In other embodiments, the MAC Capability and PHY Capability fields are omitted.

According to the embodiment shown in FIG. 14B, it is possible to reduce more power consumption than the connection procedure shown in FIG. 6, for reasons as set forth below.

First, since the hub sends an omission-type beacon frame in which the MAC Capability field is omitted, it is possible to reduce power consumption required for the hub to send beacon frames.

Secondly, in the case that the hub does not accept the connection request of the node, the hub does not send the Connection Assignment frame. Further, in the case that the node does not receive the Connection Assignment frame for a predetermined time period, the node determines that the connection to the hub is impossible and ends the reception standby state (i.e. the low-power mode). Thus, the hub does not waste power to generate and send the Connection Assignment frame. Also, it is possible to reduce power consumption of the node for receiving and processing the Connection Assignment frame.

Figure 15:
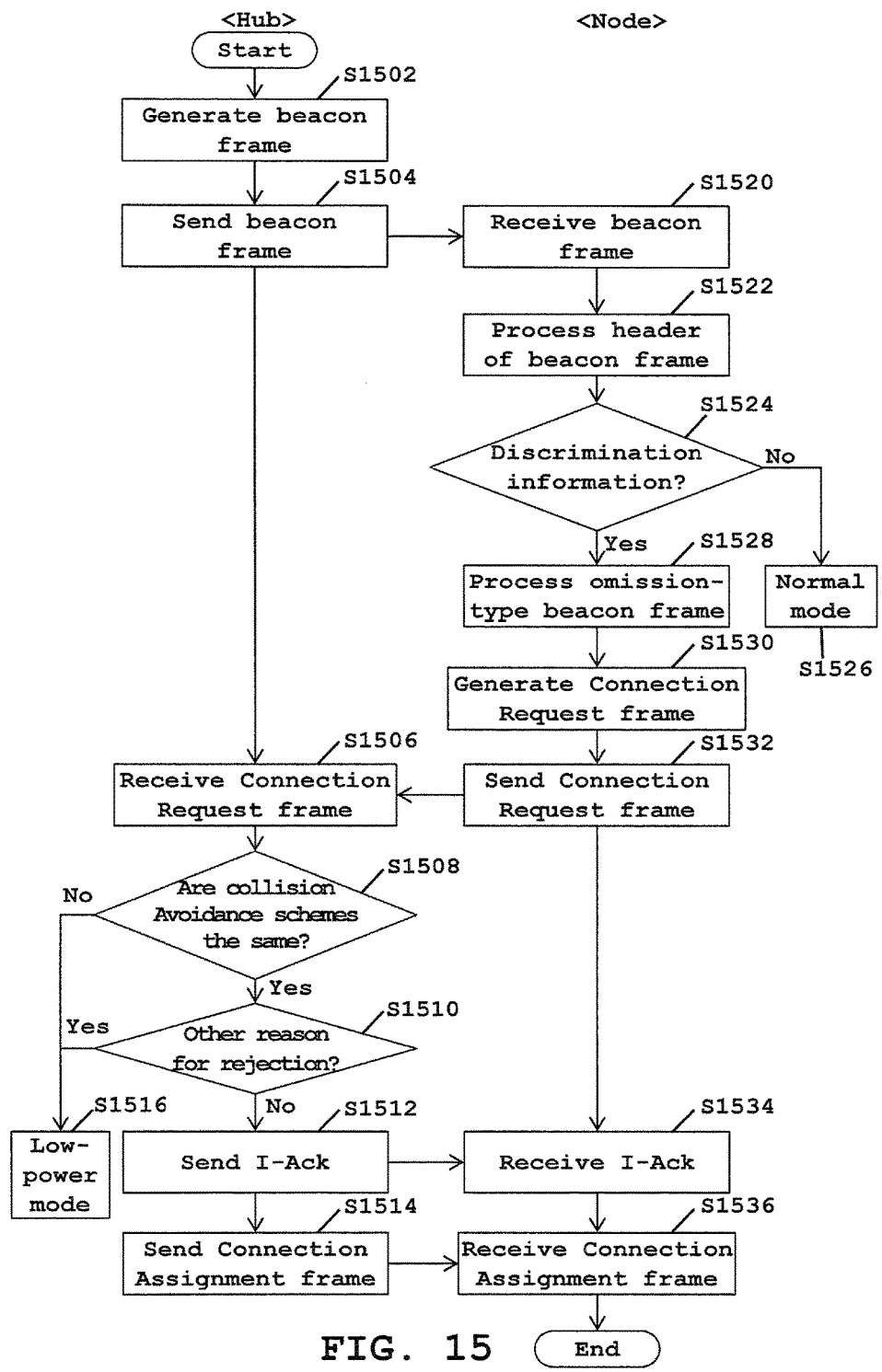
FIG. 15 is a flow chart showing an algorithm for implementing a connection process according to an embodiment of the invention.

FIG. 15 is a flow chart showing an algorithm for implementing a connection process according to an embodiment of the invention. In the following, the process will be explained referring to FIG. 15 together with FIG. 2.

If the connection process starts, the processor 220 of the hub 200 reads out necessary information from the memory 230 of the hub 200 and generates a beacon frame (Step S1502). The communicator 210 of the hub 200 sends the generated beacon frame (Step S1504). If the communicator 310 of the node 300 receives the beacon frame (Step S1520), the processor 320 of the node 300 processes the header of the beacon frame (Step S1522). By processing the header of the received beacon frame, the processor 320 determines whether or not the discrimination information indicating that the information on the collision avoidance scheme of the hub is omitted is present (Step S1524). In the case that the discrimination information is not detected (Step S1524: NO), the processor 320 determines that no information is omitted in the beacon frame and operates in a normal mode (Step S1526). In other words, the connection process proceeds as shown in FIG. 6.

In the case that the discrimination information is detected (Step S1524: YES), the processor 320 determines that the omission-type beacon frame in which specific information is omitted is received and processes the omission-type beacon frame (Step S1528). The specific information is the information on the collision avoidance scheme supported by the hub, more preferably the MAC Capability field. The processor 320 generates the Connection Request frame based on the information acquired from the beacon frame (Step S1530). The communicator 310 sends the Connection Request frame to the hub 200 (Step S1532).

In the case that the communicator 210 of the hub 200 receives the Connection Request frame from the node 300 (Step S1506), the processor 220 processes the Connection Request frame and acquires the information on the collision avoidance scheme which the node 300 supports from the MAC Capability of the payload of the Connection Request frame. The processor 220 reads out the information on the collision avoidance scheme supported by the hub 200 from the memory 230 and compares it with the acquired information on the collision avoidance scheme of the node (Step S1508). In the case that the collision avoidance schemes are the same (Step S1508: YES), the processor 220 determines whether or not there is any other reason for rejection of connection (Step S1510). In the case that there is no other reason for rejection of connection (Step S1510: NO), the processor 220 generates the I-Ack frame for acknowledging receipt of the Connection Request frame and sends it to the node 300 (Step S1512). Then, the hub 200 generates the Connection Assignment frame in which the Connection Status field of the Mode/Status field is set to 0 and sends it to the node 300 (Step S1514). After the communicator 310 of the node 300 receives the I-Ack frame and the Connection Assignment frame (Steps S1534 and S1536) and processes the frames, the connection process ends. By this, the hub 200 and the node 300 become to be able to communicate data with each other.

On the other hand, in the case that the collision avoidance schemes are not the same (Step S1508: NO) or there is any other reason for rejection of connection (Step S1510: YES), the processor 220 operates in the low-power mode (Step S1516). In other words, as shown in FIG. 14B, the hub 200 does not generate and send the I-Ack and Connection Assignment frames. If the node 300 does not receive the I-Ack frame for the Connection Request frame for a predetermined time period, the node determines that the hub 200 does not accept the connection request and ends the reception standby state. The predetermined time period is a time period allocated via the Poll in the unconnected state, i.e. the unconnected polled allocation, for example.

Second Embodiment

Figure 16A:
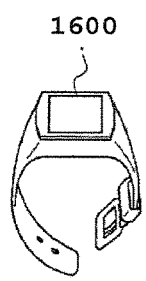
FIG. 16A shows an exterior view of a timepiece type device according to an embodiment of the invention.
Figure 16B:
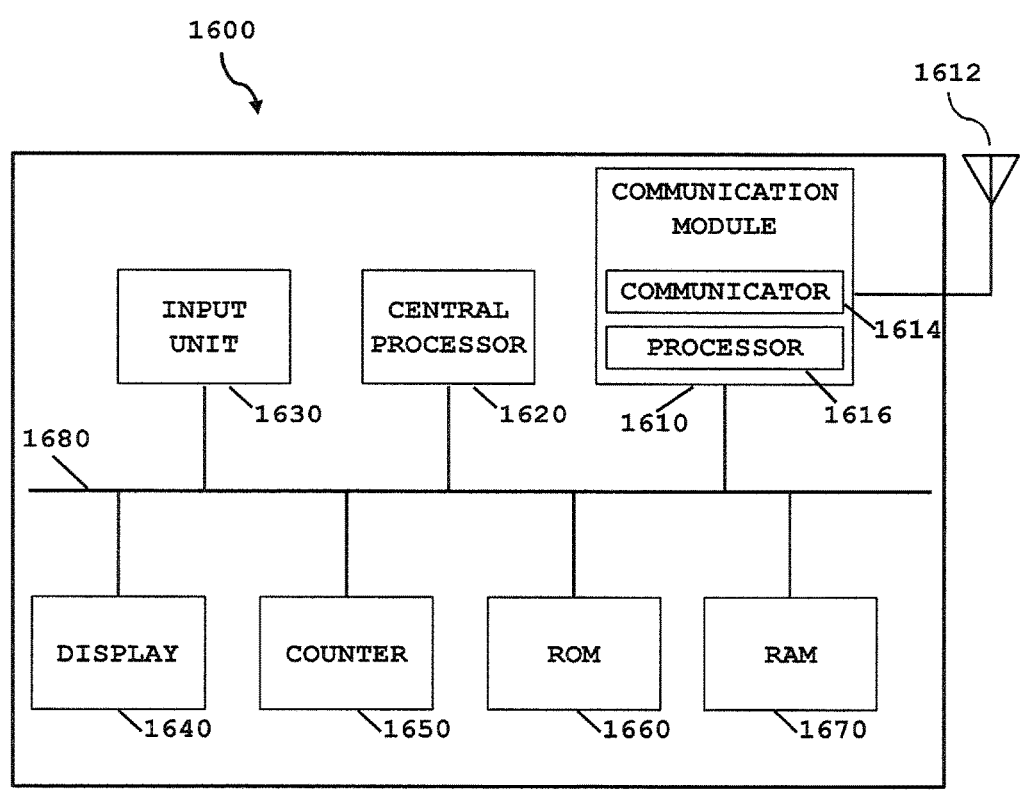
FIG. 16B is a block diagram showing a hardware configuration of the timepiece type device of FIG. 16A.

FIGS. 16A and 16B show an embodiment of a device capable of functioning as the hub or the node in the BAN. FIG. 16A shows an exterior view of the device and FIG. 16B is a block diagram showing a hardware configuration of the device. In the present embodiment, the device is a timepiece. As shown in FIG. 16B, a timepiece 1600 includes a communication module 1610, and the communication module 1610 includes an antenna 1612, a communicator 1614, and a processor 1616. The processor 1616 processes messages exchanged via the antenna 1612 and the communicator 1614 and/or via a wireline connected to the internet or a different body area network (not shown in the drawing). The processor 1616 may include software, firmware, or hardware. Since the configurations and functions of the antenna 1612, the communicator 1614, and the processor 1616 are the same as those of the antenna 212 or 312, the communicator 210 or 310, and the processor 220 or 320 as described with respect to FIG. 2, more detailed explanation on them is omitted. Further, the communication module 1610 may include a memory (not shown in the drawing) for storing frame data exchanged with other device(s), data such as the frame structure information, the medium access control information and the power management information, computer program instructions, software and/or firmware executed by the processor 1616, or the like.

A central processor 1620 includes a processing unit such as a CPU (Central Processing Unit) and controls operations of the timepiece 1600. For example, the central processor 1620 executes various processes according to programs recorded on a ROM 1660. The configurations and functions of the processor 220 or 320 described with respect to FIG. 2 can be realized by the central processor 1620 or cooperation of the central processor 1620 and the processor 1616.

An input unit 1630 includes a plurality of buttons (here, the buttons may be realized by hardware and/or software) having a function of inputting various information and instructions to the timepiece 1600. If a user manipulates the buttons, the input unit 1630 outputs instructions corresponding to the manipulated buttons to the central processor 1620. The central processor 1620 controls each unit to execute a predetermined operation according to the instructions input from the input unit 1630.

A display 1640 displays various kinds of information such as time or a message received from the outside according to an instruction from the central processor 1620.

A counter 1650 generates time signals from signals generated by a system clock or an oscillator and outputs current time.

The ROM 1660 is used to store control programs executed by the central processor 1620 and the like. Further, the ROM 1660 may be used to store computer program instructions, software and/or firmware executed by the processor 1616.

A RAM 1670 provides a work area when the central processor 1620 executes various processes and is used to store data processed by each unit of the timepiece 1600. The RAM 1670 may be used to store data such as the frame structure information, the medium access control information, and the power management information, as well as the frame data transmitted or received.

The timepiece 1600 can be connected to other device. The other device includes a sensor used to monitor data from the body such as body temperature, respiration, heart rate, or blood sugar, or a device for providing a function of controlling a pace maker, a respirator, an insulin pump, or the like, for example.

The present invention has been described with respect to specific embodiments in which it has been applied to the BAN but its application field is not limited to the BAN. For example, the invention can be applied to different wireless communication technologies such as Bluetooth (Registered Trademark), Wi-Fi (Registered Trademark), and Wi-Fi Direct (Registered Trademark).

The processes described above can be executed by hardware or software. In the case that a specific process is executed by software, a program configuring the software is installed in the communication device serving as the hub or the node from a network or a storage medium. A recording medium for recording such a program thereon includes a removable media which is distributed separately from the device's main body to provide it to users or a recording medium or the like which is provided to users in a state of being incorporated in the device's main body in advance.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A communication device, comprising:
   a communicator; and
   a processor configured to generate frames to be transmitted to another device and to process frames received from the other device,
   wherein
   the processor is further configured to operate in a first mode in which the processor controls the communicator to transmit an acknowledgement of receipt of a connection request frame and a connection assignment frame in response to receipt of the connection request frame from the other device, and to operate in a second mode in which the processor controls the communicator to transmit no acknowledgement of receipt of the connection request frame and no connection assignment frame in response to receipt of the connection request frame from the other device,
   the processor is further configured to generate a beacon frame that does not include information on a first collision avoidance scheme supported by the communication device, and
   the processor is further configured to extract, from the connection request frame received from the other device, information on a second collision avoidance scheme supported by the other device, to perform a comparison of the information on the second collision avoidance scheme with the information on the first collision avoidance scheme supported by the communication device, and to operate in the second mode in response to determining, based on the comparison, that the information on the second collision avoidance scheme supported by the other device is not the same as the information on the first collision avoidance scheme supported by the communication device.

2. The communication device of claim 1, wherein the processor is further configured to generate the beacon frame to include discrimination information indicating that the first information on the collision avoidance scheme is omitted from the beacon frame.

3. The communication device of claim 2, wherein the discrimination information is contained in a reserved field of a Frame Control field of a MAC header of the beacon frame.

4. The communication device of claim 1, wherein the processor is further configured to control the communicator to transmit a connection assignment frame indicating that a connection to the communication device is unallowable to the other device in in response to determining that the information on the second collision avoidance scheme supported by the other device is not the same as the information on the first collision avoidance scheme supported by the communication device.

5. The communication device of claim 1, wherein the first collision avoidance scheme supported by the communication device is at least one of carrier sense multiple access with collision avoidance (CSMA/CA) or Slotted Aloha.

6. The communication device of claim 1, wherein the second collision avoidance scheme supported by the other device is at least one of carrier sense multiple access with collision avoidance (CSMA/CA) or Slotted Aloha.

7. A timepiece comprising:
   the communication device of claim 1; and
   a counter configured to count current time.

8. A communication device, comprising:
   a communicator; and
   a processor configured to generate frames to be transmitted to another device and to process frames received from the other device,
   wherein
   the processor is further configured to operate in a first mode in which the processor ends reception standby for communication connection in response to a determination that a connection assignment frame received from the other device by the communicator includes information indicating that a connection to the other device is unallowable, and to operate in a second mode in which the processor ends the reception standby for communication connection in response to determining that no connection assignment frame has been received from the other device within a defined time period,
   the processor is further configured to determine whether a beacon frame received from the other device by the communicator includes discrimination information indicating that information on a collision avoidance scheme supported by the other device is omitted, and
   the processor is further configured to operate in the second mode in response to determining that the beacon frame includes the discrimination information.

9. A timepiece comprising:
   the communication device of claim 8; and
   a counter configured to count current time.

10. A system for communication, comprising:
a first device; and
a second device,
wherein
the first device comprises a first communicator and a first processor configured to generate first frames to be transmitted to the second device and to process second frames received from the second device, and
the second device comprises a second communicator and a second processor configured to generate the second frames to be transmitted to the first device and to process the first frames received from the first device,
the first processor of the first device has a first mode whereby the first processor controls the first communicator to transmit an acknowledgement of receipt of a connection request frame and a connection assignment frame in response to receipt, by the first communicator, of the connection request frame from the second device, and a second mode whereby the first processor controls the first communicator to transmit no acknowledgement of receipt of the connection request frame and no connection assignment frame in response to receipt, by the communicator, of the connection request frame from the second device,
the first processor of first device is configured to generate a beacon frame that does not include information on a first collision avoidance scheme supported by the first device and includes discrimination information indicating that the information on the first collision avoidance scheme is omitted,
the second processor of the second device has a first mode whereby the second processor ends reception standby for communication connection in response to determining that a connection assignment frame received from the first device by the second communicator includes information indicating that a connection to the first device is unallowable, and a second mode whereby the second processor ends the reception standby for communication connection in response to determining that no connection assignment frame is received from the first device within a defined time period,
the first processor of the first device is further configured to extract from the connection request frame received from the second device, information on a second collision avoidance scheme supported by the second device, to perform a comparison of the extracted information on the second collision avoidance scheme with the information on the first collision avoidance scheme supported by the first device, and to operate in the second mode in response to determining, based on the comparison, that the information on the second collision avoidance scheme supported by the second device is not equal to the information on the first collision avoidance scheme supported by the first device, and
the second processor of the second device is configured to determine whether a beacon frame received from the first device by the second communicator includes the discrimination information, and to operate in the second mode in response to determining that the beacon frame includes the discrimination information.

11. A communication method performed by a first device, the communication method comprising:
generating a beacon frame that does not include information on a first collision avoidance scheme supported by the first device;
processing a connection request frame transmitted from a second device;
extracting information on a second collision avoidance scheme supported by the second device from the connection request frame;
comparing the information on the second collision avoidance scheme supported by the second device with the information on the first collision avoidance scheme supported by the first device; and
(i) in response to determining that the information on the second collision avoidance scheme supported by the second device is the same as the information on the first collision avoidance scheme supported by the first device, operating in a first mode in which the first device transmits an acknowledgement of receipt of the connection request frame and a connection assignment frame in response to receipt at the first device of the connection request frame from the second device, and
(ii) in response to determining that the information on the second collision avoidance scheme supported by the second device is not the same as the information on the first collision avoidance scheme supported by the first device, operating in a second mode in which the first device transmits no acknowledgement of receipt of the connection request frame and no connection assignment frame in response to receipt at the first device of the connection request frame from the second device.

12. A communication method performed by a device, the communication method comprising:
determining whether a beacon frame received from another device includes discrimination information indicating that information on a collision avoidance scheme supported by the other device is omitted from the beacon frame; and
(i) in response to determining that the beacon frame does not include the discrimination information, operating in a first mode in which the device ends reception standby for communication connection in response to determining that a connection assignment frame received from the other device includes information indicating that a connection to the other device is unallowable, and (ii) in response to determining that the beacon frame includes the discrimination information, operating in a second mode in which the first device ends the reception standby for communication connection in response to determining that no connection assignment frame is received from the other device within a predetermined time period.

13. A communication method performed by a system comprising a first device and a second device, the communication method comprising:
at the first device, generating a beacon frame that does not include information on a first collision avoidance scheme supported by the first device and includes discrimination information indicating that the information on the first collision avoidance scheme is omitted from the beacon frame;
at the second device, determining whether the discrimination information is included in the beacon frame received from the first device;
at the second device, (i) in response to determining that the beacon frame does not include the discrimination information, operating in a first mode in which the second device ends reception standby for communication connection in response to determining that a connection assignment frame received from the first device includes information indicating that a connection to the first device is unallowable, and (ii) in response to determining that the beacon frame includes the discrimination information, operating in a second mode in which the second device ends the reception standby for communication connection in response to determining that no connection assignment frame is received from the first device within a predetermined time period;

at the first device, extracting, from a connection request frame received from the second device, information on a second collision avoidance scheme supported by the second device;

at the first device, comparing the information on the second collision avoidance scheme supported by the second device with the information on the first collision avoidance scheme supported by the first device, and at the first device, (i) in response to determining that the information on the second collision avoidance scheme supported by the second device is the same as the information on the first collision avoidance scheme supported by the first device, operating in a first mode in which the first device transmits an acknowledgement of receipt of the connection request frame and a connection assignment frame in response to receipt of the connection request frame from the second device, and (ii) in response to determining that the information on the second collision avoidance scheme supported by the second device is not the same as the information on the first collision avoidance scheme supported by the first device, operating in a second mode in which the first device transmits no acknowledgement of receipt of the connection request frame and no connection assignment frame in response to receipt of the connection request frame from the second device.

14. A non-transitory computer-readable recording medium that records a computer program controlling a device capable of communication, the program causing the device to perform steps of:

generating a beacon frame that does not include information on a first collision avoidance scheme supported by the device;

processing a connection request frame transmitted from another device;

extracting information on a second collision avoidance scheme supported by the other device from the connection request frame;

comparing the information on the second collision avoidance scheme of the other device with the information on the first collision avoidance scheme of the device; and (i) in response to determining that the information on the second collision avoidance scheme supported by the other device matches the information on the first collision avoidance scheme supported by the device, operating in a first mode in which the device transmits an acknowledgement of receipt of the connection request frame and a connection assignment frame in response to receipt of the connection request frame from the other device, and (ii) in response to determining that the information on the second collision avoidance scheme supported by the other device does not match the information on the first collision avoidance scheme supported by the device, operating in a second mode in which the device transmits no acknowledgement of receipt of the connection request frame and no connection assignment frame in response to receipt of the connection request frame from the other device.

15. A non-transitory computer-readable recording medium having stored thereon a computer program controlling a device capable of communication, the program causing the device to perform steps of:

determining whether a beacon frame received from another device includes discrimination information indicating that information on a collision avoidance scheme supported by the other device is omitted from the beacon frame; and (i) in response to determining that the beacon frame does not include the discrimination information, operating in a first mode in which the device ends reception standby for communication connection in response to determining that a connection assignment frame received from the other device includes information indicating that a connection to the other device is unallowable, and (ii) in response to determining that the beacon frame includes the discrimination information, operating in a second mode in which the device ends the reception standby for communication connection in response to determining that no connection assignment frame is received from the other device within a predetermined time period.

* * * * *